US010812137B2

(12) United States Patent
Bains et al.

(10) Patent No.: US 10,812,137 B2
(45) Date of Patent: Oct. 20, 2020

(54) SWITCH FOR USE WITH SINGLE PAIR ETHERNET ON FOUR-PAIR CABLING

(71) Applicant: CISCO TECHNOLOGY, INC., San Jose, CA (US)

(72) Inventors: Amrik S. Bains, Livermore, CA (US); Kenneth Christian Naumann, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/254,263

(22) Filed: Jan. 22, 2019

(65) Prior Publication Data

US 2020/0235780 A1 Jul. 23, 2020

(51) Int. Cl.
*H04B 3/32* (2006.01)
*H04B 3/23* (2006.01)
*H04L 12/10* (2006.01)

(52) U.S. Cl.
CPC ............... *H04B 3/32* (2013.01); *H04B 3/23* (2013.01); *H04L 12/10* (2013.01)

(58) Field of Classification Search
CPC ............. H04B 3/32; H04B 3/23; H04L 12/10
See application file for complete search history.

(56) References Cited

U.S. PATENT DOCUMENTS

| 6,259,745 | B1 | 7/2001 | Chan | |
|---|---|---|---|---|
| 7,835,389 | B2 | 11/2010 | Yu et al. | |
| 2006/0182014 | A1* | 8/2006 | Lusky | H04B 3/23 370/201 |
| 2007/0143811 | A1* | 6/2007 | Powell | H04L 12/40032 725/127 |
| 2007/0174492 | A1* | 7/2007 | Light | H04L 43/00 709/250 |
| 2007/0263857 | A1* | 11/2007 | Sharon | H04B 3/32 379/416 |
| 2007/0286158 | A1* | 12/2007 | Cook | H04L 29/06027 370/352 |
| 2009/0257581 | A1* | 10/2009 | Biyani | H04B 3/32 379/417 |
| 2016/0352535 | A1 | 12/2016 | Hiscock et al. | |

OTHER PUBLICATIONS citeseerx.ist.psu.edu, Mattias Nilsson, Gigabit Ethernet over Category 5 unshielded twisted pair cable, Oct. 10, 2018, pp. 01-43.
cs.hadassah.ac.il, 3Com Corporation, 1000BASE-T: Gigabit Ethernet over Category 5 Copper Cabling, Oct. 10, 2018, pp. 01-16.

* cited by examiner

*Primary Examiner* — Mohammad S Anwar
(74) *Attorney, Agent, or Firm* — Cindy Kaplan

(57) ABSTRACT

In one embodiment, an apparatus includes four independent single pair Ethernet ports coupled to a cable comprising four wire pairs for communication with a micro-switch, the micro-switch configured for communication with four endpoint devices, each of the endpoint devices in communication with the micro-switch over a single pair Ethernet cable comprising one of the four wire pairs. Each of the four independent single pair Ethernet ports comprises an echo canceller for receiving input from a transmitter at one of the independent single pair Ethernet ports and each of the other independent single pair Ethernet ports to cancel alien crosstalk between the four wire pairs.

20 Claims, 5 Drawing Sheets

SWITCH FOR USE WITH SINGLE PAIR ETHERNET ON FOUR-PAIR CABLING

TECHNICAL FIELD

The present disclosure relates generally to network switches, and more particularly, to a switch for use with Single Pair Ethernet (SPE) on four-pair cabling.

BACKGROUND

Conventional Ethernet cabling uses four-pair cables to transmit data over networks and deliver power via Power over Ethernet (PoE). With the growth of Internet of Things (IoT) along with industrial and automotive applications, interest has increased for Single Pair Ethernet (SPE). Since most IoT devices require very little bandwidth as compared to typical data applications using traditional four-pair cabling, SPE provides a more compact and economical solution. However, implementation of SPE is limited since installed cabling typically comprises four-pair cables.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
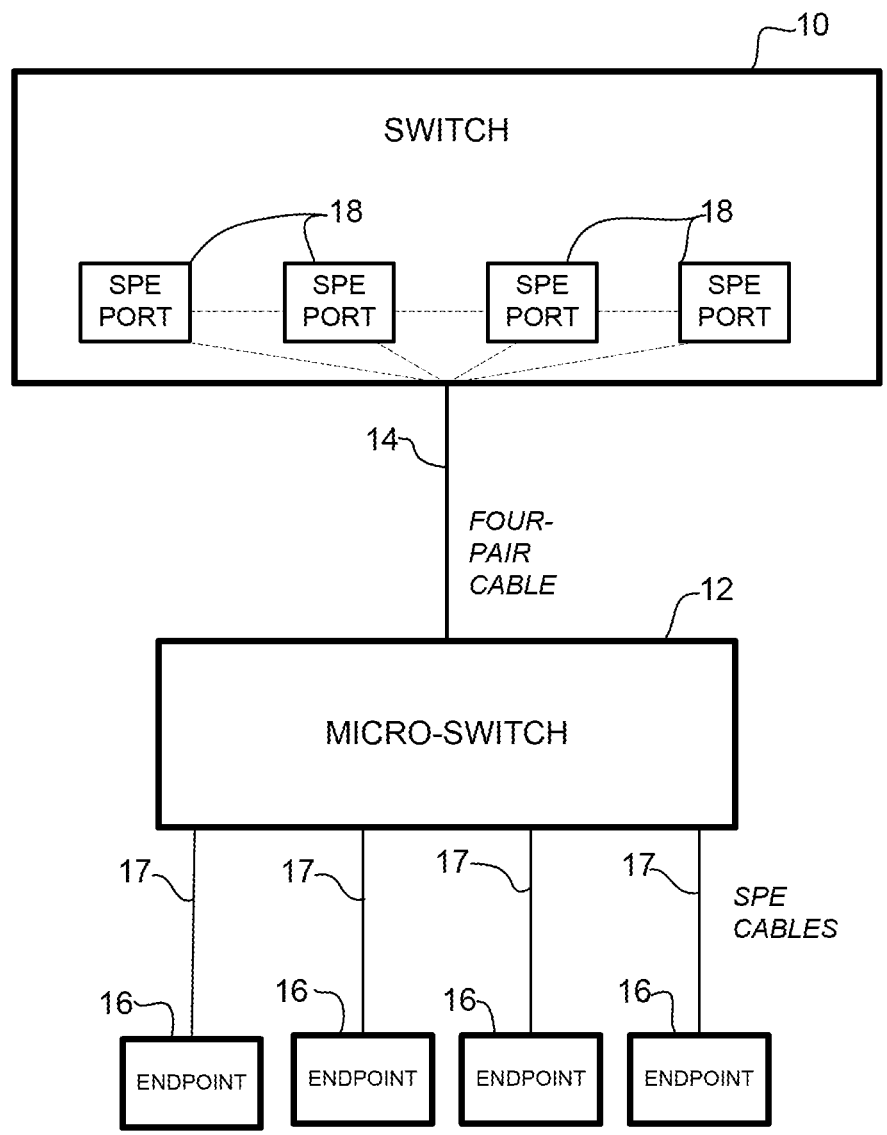
FIG. 1 illustrates a switch in communication with a plurality of endpoint devices over SPE through a break-out micro-switch, in accordance with one embodiment.

In one embodiment, an apparatus generally comprises four independent single pair Ethernet ports coupled to a cable comprising four wire pairs for communication with a micro-switch, the micro-switch configured for communication with four endpoint devices, each of the endpoint devices in communication with the micro-switch over a single pair Ethernet cable comprising one of the four wire pairs. Each of the four independent single pair Ethernet ports comprises an echo canceller for receiving input from a transmitter at one of the independent single pair Ethernet ports and each of the other independent single pair Ethernet ports to cancel alien crosstalk between the four wire pairs.

A micro-system may comprise a point-to-point with PHY for each pair and passive break-out with no management, packet buffer, or forwarding processing.

In one or more embodiments, the apparatus comprises a switch operable to transmit power over Ethernet to the endpoint devices. The switch may comprise a plurality of receptacles for communication with a plurality of four-pair cables in communication with micro-switches, each of the micro-switches in communication with a plurality of endpoint devices over single pair Ethernet cables. The apparatus may comprise an access switch and each of the independent single pair Ethernet ports may comprise an independent data source for transmitting data to one of the endpoint devices.

In one or more embodiments, the alien crosstalk comprises alien near-end crosstalk and an output at the echo canceller is added to an equalizer receiving input from a receiver at the independent single pair Ethernet port.

In another embodiment, a method generally comprises transmitting data from four independent single pair Ethernet ports at a switch to a micro-switch over a cable comprising four wire pairs, the micro-switch configured for communication with four endpoint devices, each of the endpoint devices in communication with the micro-switch over a single pair Ethernet cable comprising one of the four wire pairs, receiving input at echo cancellers located at each of the four independent single pair Ethernet ports, said input received from a transmitter at the independent single pair Ethernet port and each of the other independent single pair Ethernet ports, and cancelling alien crosstalk between the four wire pairs at the switch.

In yet another embodiment, a switch generally comprises four independent single pair Ethernet ports coupled to a cable comprising four wire pairs for communication with a micro-switch and the micro-switch coupled to four single pair Ethernet cables each comprising one of the four wire pairs for communication with endpoint devices. Each of the four independent single pair Ethernet ports comprises a crosstalk cancellation module for cancelling alien crosstalk between the four wire pairs.

Further understanding of the features and advantages of the embodiments described herein may be realized by reference to the remaining portions of the specification and the attached drawings.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

With the growing need to provide cost effective power and data connectivity to the large number of endpoint devices that will be deployed in the future, Single Pair Ethernet (SPE) has emerged as a promising technology. SPE enables data transmission over Ethernet via a single pair of wires while also providing a power supply to end devices (e.g., Power over Ethernet (PoE), Power over Data Line (PoDL)) to pass electrical power along with data to allow a single cable to provide both data connectivity and electrical power to endpoint devices. New Ethernet applications are planned for use with single pair copper cables in the Enterprise, industrial applications, automotive Ethernet, and IoT devices (e.g., sensors, actuators, appliances, vehicles, lighting, health care monitoring devices, traffic control, phones, video cameras, point-of-sale devices, security access control devices and systems, residential devices, building and home automation, energy management, manufacturing equipment, smart systems, and many more applications). For low cost and compact electronics that consume little power, SPE provides numerous advantages over conventional systems.

Implementation of SPE in existing systems (e.g., Enterprise systems) is limited since most installed cabling is four-pair cabling. Installation of new cables in existing systems is costly and results in high downtime. New cables are typically only installed in new construction or remodeling.

The embodiments described herein provide for the use of current four-pair cabling with break-out to four individual endpoint devices using SPE. The embodiments allow for single pair Ethernet on installed unstructured cabling between access nodes and micro-switches while endpoint devices use SPE cables. Thus, installed cables may be used to provide SPE features and port expansion with break-out cables at a micro-switch for a plurality of endpoint devices. As described in detail below, each pair in the four pair cable is associated with an independent SPE port, providing a four port single connector system with break-out at the endpoint devices. In one or more embodiments, the SPE ports are configured to reduce alien crosstalk between the SPE channels (wire pairs).

Alien crosstalk is a significant transmission parameter impacting Ethernet communication systems. Alien crosstalk consists of unwanted signal coupling from one channel to another and occurs between adjacent cables in conventional four-pair cabling systems. In the hybrid system described herein using conventional four-pair cabling with independent single pair Ethernet channels for break-out transmission on SPE cables, alien crosstalk may impact network performance on the four-pair cable since the four wire pairs are twisted together allowing for proximity capacitive coupling. As described in detail below, each SPE port monitors noise on the other three wire pairs and uses echo cancellation to cancel alien and near-end crosstalk between the pairs and improve receiver performance in the data transmission system.

The embodiments described herein operate in the context of a data communications network including multiple network devices. The network may be configured for PoE, PoE+, PoDL, or other power over communications cable system and includes any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, Internet of Things (IoT) network, radio access network, public switched network, or any other network). Cables (e.g., four-pair cable, SPE cable) may be used to connect communications equipment and carry both data and power. Signals may be exchanged among communications equipment or devices and power transmitted from PSE (Power Sourcing Equipment) to PDs Powered Devices.

Referring now to the drawings, and first to FIG. 1, a simplified network implementing the embodiments described herein is shown in accordance with one embodiment. In this example, a switch 10 is in communication with a micro-switch 12 over a conventional four-pair cable 14 with break-out at the micro-switch to four endpoint devices 16 using a single pair cable 17 configured for SPE communication to and from each of the endpoint devices. The four-pair cable 14 carries four independent data and PoE transmissions over each of the four pairs. The switch 10 includes four individual SPE ports ((PHY), data sources) 18 for transmitting/receiving data between the switch 10 and the endpoint devices 16 using the four-pair cable 14 from the switch to the micro-switch 12 and SPE cables 17 from the micro-switch to the endpoint devices 16. Each SPE port 18 comprises an independent single Ethernet port for data transmission over the single pair Ethernet cables 17. In one or more embodiments, each SPE channel may carry an identifier (ID) tag, which is used at the micro-switch 12 to fan in/out four ports over the four-pair cable 14 and SPE cables 17. In one or more embodiments, the network is configured to allow the four independent channels to convey information that is transmitted per a single-pair twisted cabling system at a distance, for example, from 5 meters to 200 meters (or other suitable distance).

As previously noted, transmission performance of the hybrid system using four-pair cable 14 and SPE cables 17 to transmit four independent Ethernet channels may be impacted by crosstalk between the individual SPE channels on each twisted pair. As described in detail below with respect to FIG. 2, the individual SPE ports 18 further include components to reduce crosstalk (alien crosstalk, NEXT (near-end crosstalk), ANEXT (alien NEXT), echo, interference).

The switch 10 may comprise, for example, a data center Ethernet switch comprising any number of RJ45 receptacles for connection to four-pair cabling in communication with any number of micro-switches 12. For example, the switch 10 may comprise a 1RU (Rack Unit) switch comprising 48 RJ45 receptacles and optical uplinks. The 48 receptacles may provide, for example, 192 independent SPE ports 18 for communication with a corresponding number of endpoint devices 16. The four individual SPE ports 18 monitor (receive information from) the other three SPE ports for use in crosstalk cancellation. Each SPE port 18 is in communication with the four pair cable over a single connector (e.g., RJ45 connector). In one or more embodiments, the switch 10 may comprise an access switch with CPU (Central Processing Unit) and a data switch. The switch 10 may not need to run an operating system such as IOS (Internetwork Operating System), resulting in a low cost switch.

The micro-switch 12 may comprise one or more RJ45 receptacles for receiving one or more 4-pair cables 14 connected to the switch 10 (or another switch). The micro-switch 12 comprises four or more receptacles for receiving four or more of the SPE cables 17 for communication with four or more endpoint devices 16. Each of the endpoint devices 16 communicates with the micro-switch 12 over one wire pair on the SPE cable 17. It is to be understood that the term "micro-switch" as used herein refers to any network device operable to receive/transmit data on independent channels carried together in a cable (e.g., four-pair cable) and transmit/receive the data on single pair Ethernet cables in communication with endpoint devices.

The endpoint device 16 may comprise, for example, a sensor, actuator, appliance, lighting device, monitoring device, traffic control device, phone, video camera, point-of-sale device, security access control device, building and home automation device, energy management device, IoT device, and the like. The endpoint device 16 comprises at least one receptacle for receiving the SPE cable 17 in communication with the micro-switch 12.

The four-pair cable 14 may comprise Cat5e/6 (or any other suitable cable) at a distance of 100 m (or other suitable distance) for transmitting data at speeds up to 10G, for example, and may be configured for PoE. The cable 17 is configured for single pair Ethernet and comprises two conductors (copper wires). The cables 17 transmitting/receiving data between the micro-switch 12 and the endpoint devices 16 may comprise SPE cables (shielded or unshielded), 100 m (or other length), for transmitting data at speeds of 2.5G, for example. The SPE cable 17 carries data and PoE/PoDL associated with one SPE port 18 and one physical port on the switch 10. For example, the cables 17 may transmit PoDL/ PoE at 30 W with 24 AWG (American Wire Gauge) cable. The SPE cables 17 may each be the same length or one or more of the cables may be a different length.

The cables 14, 17 may be configured according to a standard cable gauge and rated for one or more power or current levels, a maximum power level, a maximum temperature, or identified according to one or more categories indicating acceptable power level usage, for example. In one example, the cables 14, 17 correspond to a standardized wire gauge system such as AWG (American Wire Gauge). For different gauge wire, AWG provides data including diameter, area, resistance per length, ampacity (maximum amount of current a conductor can carry before sustaining immediate or progressive deterioration), and fusing current (how much current it takes to melt a wire in free air). Various other standards (e.g., NEC (National Electrical Code), UL (Underwriters Laboratories)) may be used to provide various requirements for the cables and connectors and provide temperature or power ratings or limits, or other information.

In one or more embodiments, the SPE cables 17 may connect to the micro-switch 12 and endpoints 16 using a connector system as described in U.S. patent application Ser. No. 16/184,430, filed Nov. 8, 2018, entitled "Single Pair Ethernet Connector System", which is incorporated herein by reference in its entirety. The SPE connector system comprises SPE receptacles and SPE plugs along with a receptacle housing assembly for attaching one or more of the receptacles to a printed circuit board at the network device for use in an SPE network system. The connector system provides for SPE communications between devices (e.g., micro-switch 12 and IoT or other endpoint devices 16 configured for single pair Ethernet operation) and may also transmit power from PSE (Power Sourcing Equipment) (e.g., switch 10) to PDs (Powered Devices) (endpoint devices 16).

It is to be understood that the network devices and topology shown in FIG. 1 and described above are only examples and the embodiments described herein may be implemented in networks comprising different network topologies or network devices, or using different protocols, without departing from the scope of the embodiments. For example, the switch 10 may be in communication with any number of endpoint devices 16 through any number of micro-switches 12 and may also provide power to one or more of the devices over the four-pair cable 14 and single pair Ethernet cable 17.

As previously noted, the hybrid cable network system shown in FIG. 1 may suffer from crosstalk. Near-end crosstalk (NEXT) occurs when a local transmitter affects a local receiver. NEXT is the noise induced by a transmitter to a neighboring receiver due to unwanted signal coupling. Where there is a mismatch between the transmitter output impedance and the cable's characteristics, all the power of the signal is not transferred on to the cable. The portion not transferred is reflected back to the source. The reflected signal is called echo because it is reflected back to the transmitting PHY and becomes interference at the local transmitter. Bidirectional transmission on the same wire results in echo. Echo is countered by echo cancellation.

Alien crosstalk results from unwanted signal coupling from one channel to another. Alien crosstalk is not an issue between twisted pairs with conventional systems using one port for communication over the four-pair cable. In contrast to conventional four-pair cable systems comprising a single PHY for transmitting/receiving data to or from a single data source (port), the switch 10 comprises four independent data sources (SPE ports, PHY) 18 comprising transmitters and receivers that enable generation of signals to be transmitted to the corresponding endpoint devices 16 and processing of signals received from the endpoint devices at the other end of each of the twisted pairs on four independent channels for implementation of single pair Ethernet using installed four-pair wire cables. In the hybrid cable system shown in FIG. 1, alien crosstalk occurs between the four independent SPE channels and impacts transmission performance on the four-pair cable 14. Embodiments described herein provide crosstalk cancellation (referred to herein as Alien Near-End Crosstalk (ANEXT) cancellation) to improve receiver performance in the data transmission system and allow SPE to use installed four-pair cabling between the switch 10 and the micro-switch 12 to communicate with the endpoint devices 16 using SPE.

Figure 2:
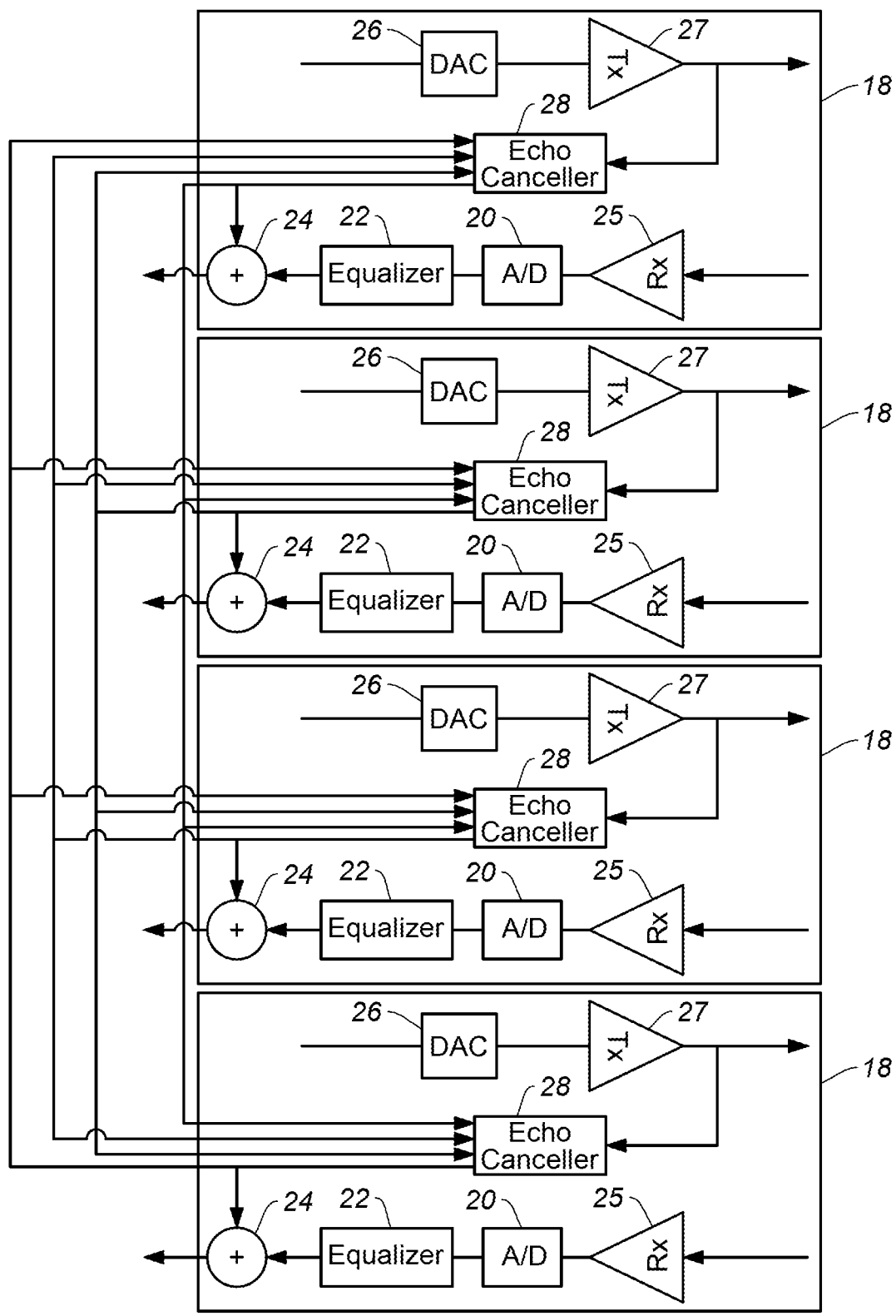
FIG. 2 illustrates a system for crosstalk cancellation, in accordance with one embodiment.

FIG. 2 illustrates an example of components located at each of the SPE ports 18 at the switch 10 (FIG. 1). Each SPE port 18 includes an echo canceller 28 to cancel alien crosstalk and interference due to its own transmitter (driver) on the receiver path. Since the independent data sources 18 are connected to one another at the switch 10, the echo canceller 28 for each twisted pair can monitor noise from the other three SPE channels and cancel alien crosstalk along with NEXT to improve receiver performance in the data transmission system (FIGS. 1 and 2). As shown in the example of FIG. 2, a crosstalk cancellation system for each SPE port/twisted pair comprises an analog-to-digital converter (A/D) 20, an equalizer 22, and an adder 24 downstream of a receiver 25, a digital-to-analog converter (DAC) 26 upstream of a transmitter 27 and the echo canceller 28 receiving input from the transmitter and from the echo cancellers for the other three twisted pairs. An echo component may be received in a twisted pair wire from an echo that results from the local transmitter 27 on the same twisted pair wire. An alien crosstalk component may also be received from the other three twisted pair wires at the three other SPE ports transmitting/receiving data on the same four-pair cable.

The A/D 20 and DAC 26 comprise suitable logic and circuits for converting analog signals into digital signals and digital signals into analog signals, respectively. The echo canceller 28 comprises suitable logic and circuits for cancelling at least a portion of the echo component. The adder 24 adds the output of the equalizer 22 and the output of the echo canceller 28, which is also transmitted to the other wire pairs so that the echo canceller takes into account echo components (symbols) from the other three wire pairs.

Figure 3:
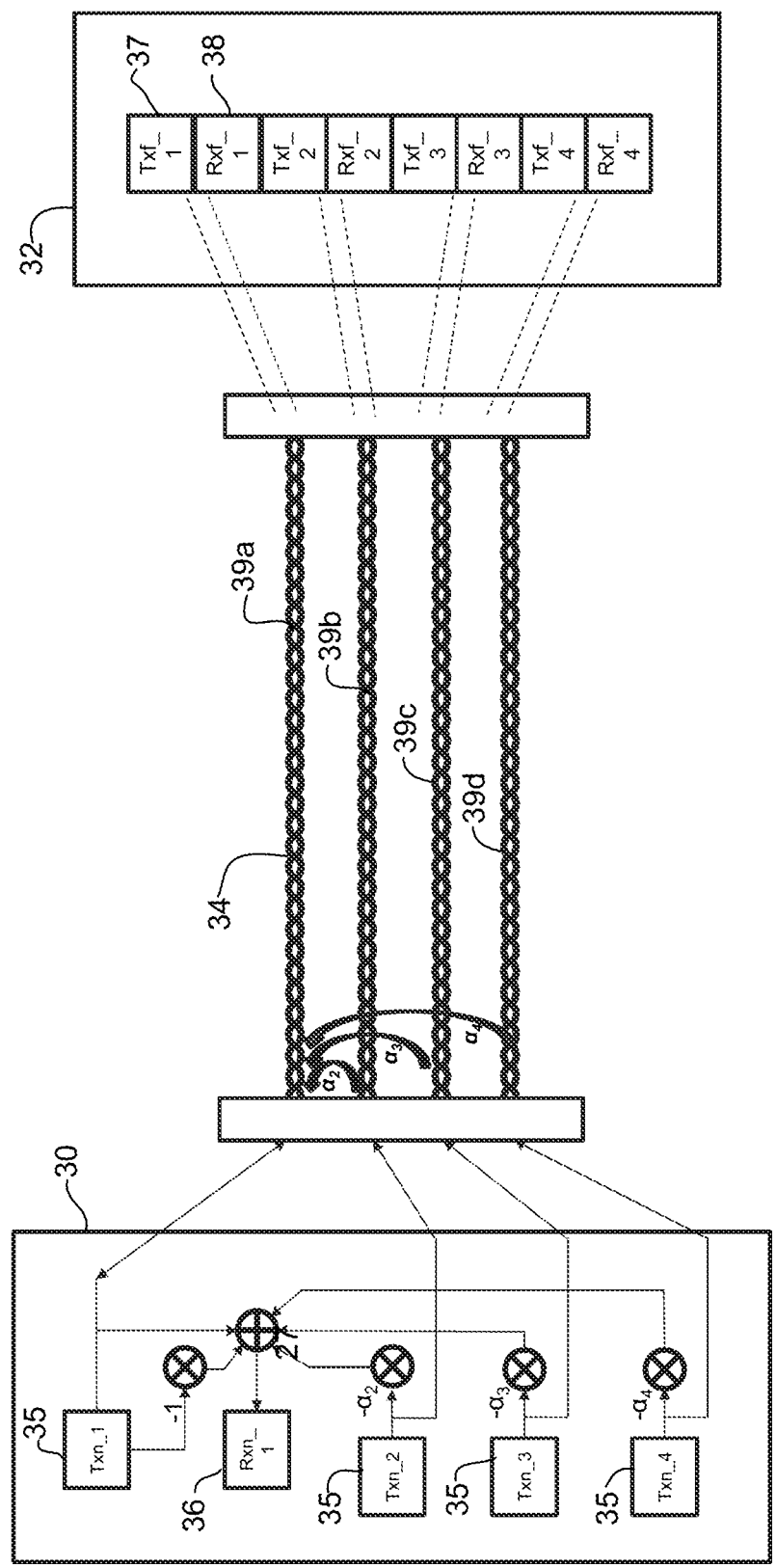
FIG. 3 illustrates crosstalk cancellation at the switch, in accordance with one embodiment.

FIG. 3 illustrates ANEXT port cancellers for four port PHY, in accordance with one embodiment. A near end four port node 30 (e.g., at switch 10) is in communication with a far end four port node 32 (e.g., at micro-switch 12) over a four-pair cable 34 (e.g., cable 14) (FIGS. 1 and 3). The cable 34 comprises four twisted pairs 39a, 39b, 39c, and 39d. The end-to-end transmission model shows a crosstalk coupling coefficient $\alpha_k$ for channel k (channels 2, 3, and 4) at channel 1. Similar behavior occurs on remaining ports at the near end (e.g., crosstalk coupling coefficient $\alpha_1$, $\alpha_z$, and $\alpha_3$ at channel 4, crosstalk coupling coefficient $\alpha_1$, $\alpha_2$, and $\alpha_4$ at channel 3, and crosstalk coupling coefficient $\alpha_1$, $\alpha_3$, and $\alpha_4$ at channel 2). For simplification, the crosstalk coupling coefficients are only shown at channel 1. As previously described, four port PHY can use neighboring port data for alien and near-end crosstalk cancellation. Known alien independent data at the transmitter can be used to cancel the NEXT crosstalk. Transmitters (Txn_1, Txn_2, Txn_3, Txn_4) 35 and receiver (Rxn_1) 36 (only one shown for simplification) are shown at the near end port 30 and transmitters (Txf_1, Txf_2, Txf_3, Txf_4) 37 and receivers (Rxf_1, Rxf_2, Rxf_3, Rxf_4) 38 are shown at the far end port 32.

The following are example calculations for alien NEXT port cancellers for the 4 port PHY, in accordance with one embodiment.

In general, $Rxn\_k(t) = Txn\_k(t) + Txf\_k(t)*f(t) + ANEXT(t) + G_w$

Wherein:
  k=1:4; channel number within the 4-pair channel model;
  n=near end designator;
  f=far end designator;
  f(t)=channel response; and
  $G_w$=additive white Gaussian noise.

For port 1:

$$Rxn\_1(t) = Txn\_1(t) + Txf\_1(t)*f(t) + ANEXT(t) + G_w$$

The ANEXT(t) term is replaced with the crosstalk coupling coefficients for the other three channels (2, 3, 4) (ANEXT(t)=$\alpha_2 Txn\_2(t) + \alpha_3 Txn\_3(t) + \alpha_4 Txn\_4(t)$) and Rxn_1(t) is calculated for port 1 as follows:

$$Rxn\_1(t) = Txn\_1(t) + Txf\_1(t)*f(t) + \alpha_2 Txn\_2(t) + \alpha_3 Txn\_3(t) + \alpha_4 Txn\_4(t) + G_w$$

The known Txn_1(t) is subtracted and the alien terms (PHY ports 2, 3, 4 transmitter information are known) are subtracted using knowledge from the NEXT cancellers equalization. This yields:

$$Rxn\_1(t) = Txn\_1(t) + Txf\_1(t)*f(t) + \alpha_2 Txn\_2(t) + \alpha_3 Txn\_3(t) + \alpha 4 Txn\_4(t) + G_w - (Txn\_1(t) + \alpha_2 Txn\_2(t) + \alpha 3 Txn\_3(t) + \alpha_4 Txn\_4(t))$$

Simplifying the above equation provides:

$$Rxn\_1(t) \approx Txf\_1(t)*f(t) + G_w$$

Similarly, using alien data at the transmitters and self cancellers for ports 2, 3, and 4 provides:

$$Rxn\_2(t) \approx Txf\_2(t)*f(t) + G_w$$

$$Rxn\_3(t) \approx Txf\_3(t)*f(t) + G_w$$

$$Rxn\_4(t) \approx Txf\_4(t)*f(t) + G_w$$

Thus, the effect of ANEXT on the received signal at a channel may be determined based on a far end transmission signal on the channel, channel response, and additive white Gaussian noise. The four port PHY uses neighboring port data for near end cancellation and known alien independent data at the transmitter to cancel the ANEXT crosstalk.

It is to be understood that the equations shown above are only examples and modifications may be made without departing from the scope of the embodiments.

Figure 4:
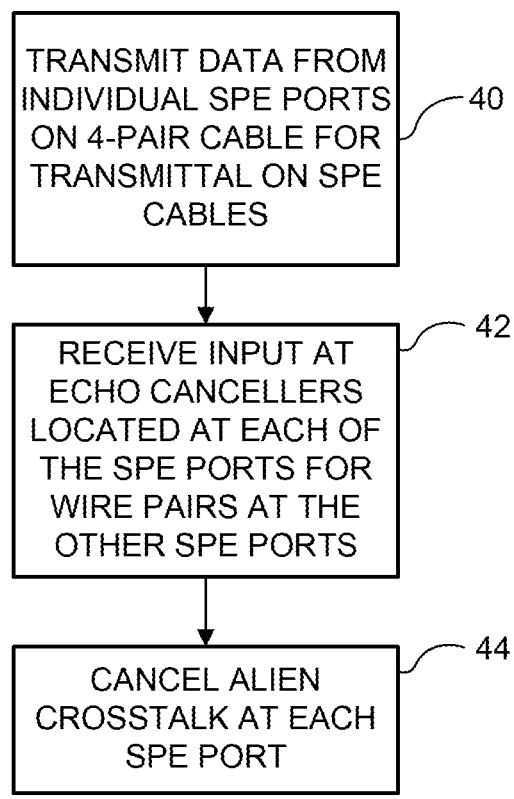
FIG. 4 is a flowchart illustrating a process for crosstalk cancellation, in accordance with one embodiment.

FIG. 4 is a flowchart illustrating an overview of a process for cancelling crosstalk in a hybrid four-pair cable and SPE cable network transmitting/receiving data on four independent SPE channels, in accordance with one embodiment. At step 40, a switch transmits data from four independent single pair Ethernet ports to a micro-switch over cable comprising four wire pairs. For example, the switch 10 in FIG. 1 may communicate with the micro-switch 12 configured for communication with four endpoint devices 16. Each of the endpoint devices 16 is in communication with the micro-switch 12 over the single pair Ethernet cable 17 comprising one of the four wire pairs. Echo cancellers 28 located at each of the four independent single pair Ethernet ports 18 receive input from the transmitter 27 at the port and each of the echo cancellers at the other single pair Ethernet ports (step 42) (FIGS. 1, 2, and 4). The input is used to cancel alien near-end crosstalk at each of the independent single pair Ethernet ports (step 44).

It is to be understood that the process shown in FIG. 4 is only an example and steps may be added or modified, without departing from the scope of the embodiments.

Figure 5:
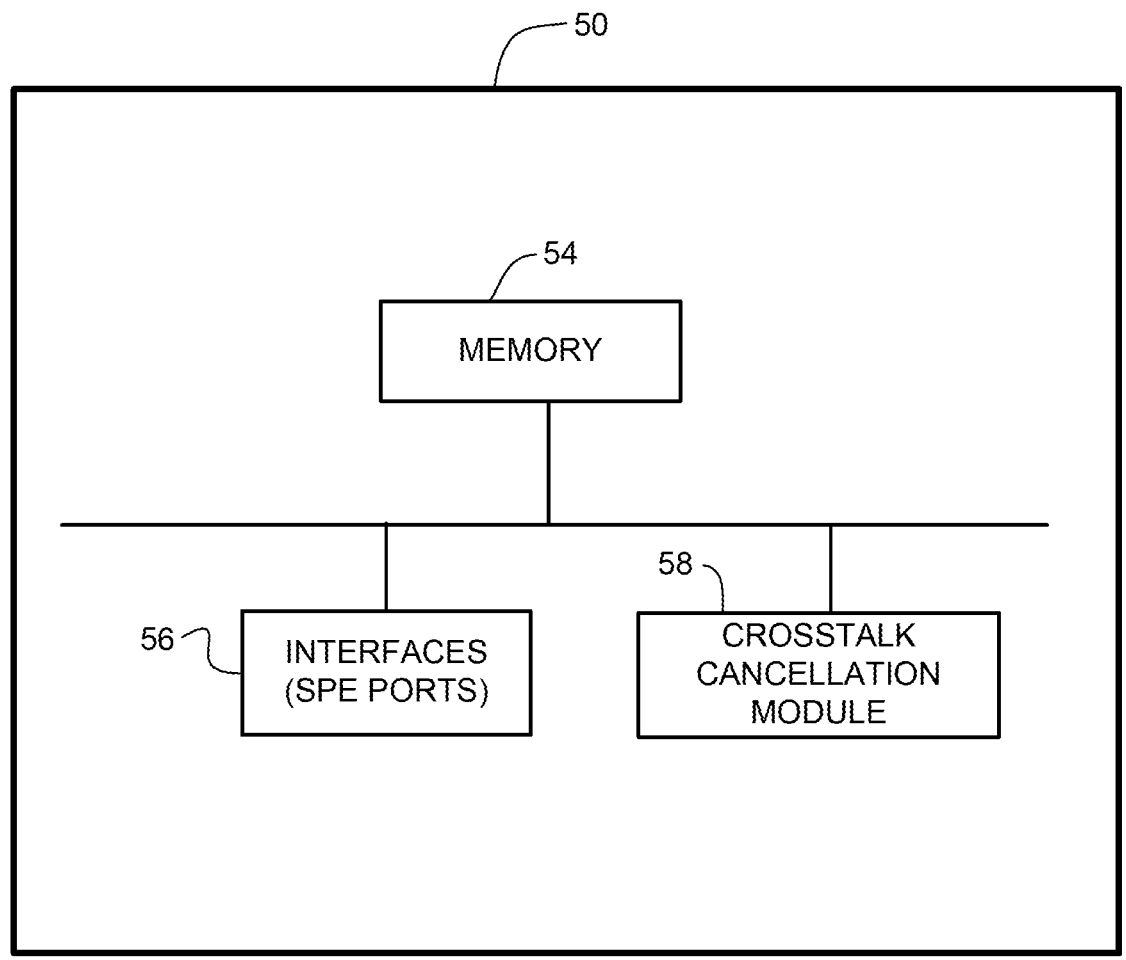
FIG. 5 depicts an example of a network device useful in implementing embodiments described herein.

FIG. 5 illustrates an example of a network device 50 (e.g., micro-switch 12) that may be used to implement the embodiments described herein. In one embodiment, the network device 50 is a simple machine that may be implemented in hardware with non-volatile memory and without a local processor. The network device 50 includes memory 54, network interfaces 56, and crosstalk cancellation module 58.

Memory 54 may store firmware for use by the crosstalk cancellation module 58. For example, crosstalk cancellation components 58 (e.g., module, code, logic, software, firmware, etc.) may be stored in memory 54. The device 50 may include any number of memory components.

The network interface 56 may comprise any number of interfaces (linecards, ports) for receiving data or transmitting data to other devices. The network interface 56 may include, for example, an Ethernet interface for connection to a computer or network. The network interface 56 may be configured to transmit or receive data using a variety of different communication protocols. The interface may include mechanical, electrical, and signaling circuitry for communicating data over physical links coupled to the network.

It is to be understood that the network device 50 shown in FIG. 5 and described above is only an example and that different configurations of network devices may be used. For example, the network device 50 may further include any suitable combination of hardware, software, devices, components, modules, or elements operable to facilitate the capabilities described herein.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. An apparatus comprising:
    four independent single pair Ethernet ports coupled to a cable comprising four wire pairs for communication with a micro-switch, the micro-switch configured for communication with four endpoint devices, each of the endpoint devices in communication with the micro-switch over a single pair Ethernet cable comprising one of the four wire pairs;
    wherein each of the four independent single pair Ethernet ports comprises an echo canceller for receiving input from a transmitter at one of the independent single pair Ethernet ports and each of the other independent single pair Ethernet ports to cancel alien crosstalk between the four wire pairs.

2. The apparatus of claim 1 wherein the alien crosstalk comprises alien near-end crosstalk.

3. The apparatus of claim 1 wherein the apparatus comprises a switch operable to transmit power over Ethernet to the endpoint devices.

4. The apparatus of claim 1 wherein the apparatus comprises a switch comprising a plurality of receptacles for communication with a plurality of four-pair cables in communication with micro-switches, each of the micro-switches in communication with a plurality of endpoint devices over single pair Ethernet cables.

5. The apparatus of claim 1 wherein an output at the echo canceller is added to an equalizer receiving input from a receiver at the independent single pair Ethernet port.

6. The apparatus of claim 1 wherein each of the independent single pair Ethernet ports comprises an independent data source for transmitting data to one of the endpoint devices.

7. The apparatus of claim 1 wherein the apparatus comprises an access switch.

8. A method comprising:
transmitting data from four independent single pair Ethernet ports at a switch to a micro-switch over a cable comprising four wire pairs, the micro-switch configured for communication with four endpoint devices, each of the endpoint devices in communication with the micro-switch over a single pair Ethernet cable comprising one of the four wire pairs;
receiving input at echo cancellers located at each of the four independent single pair Ethernet ports, said input received from a transmitter at the independent single pair Ethernet port and each of the other independent single pair Ethernet ports; and
cancelling alien crosstalk between the four wire pairs at the switch.

9. The method of claim 8 further comprising transmitting power over the cable comprising four wire pairs and the single pair Ethernet cable.

10. The method of claim 8 wherein cancelling said alien crosstalk comprises adding an output from the echo canceller to an output at an equalizer receiving input from a receiver at the independent single pair Ethernet port.

11. The method of claim 8 wherein cancelling the alien crosstalk comprises modifying a received signal based on a far end transmitter signal, channel response, and additive white Gaussian noise.

12. The method of claim 8 wherein the switch comprises an access switch comprising a plurality of receptacles for communication with a plurality of micro-switches.

13. A system comprising:
a switch comprising four independent single pair Ethernet ports coupled to a cable comprising four wire pairs for communication with a micro-switch; and
the micro-switch coupled to four single pair Ethernet cables each comprising one of the four wire pairs for communication with endpoint devices;
wherein each of the four independent single pair Ethernet ports comprises a crosstalk cancellation module for cancelling alien crosstalk between the four wire pairs.

14. The system of claim 13 further comprising four of the endpoint devices.

15. The system of claim 13 wherein the crosstalk cancellation module comprises an echo canceller for receiving input from a transmitter at the port and each of the echo cancellers at the other ports.

16. The system of claim 13 wherein the switch is operable to transmit power over the cable comprising four wire pairs and the single pair Ethernet cable.

17. The system of claim 13 wherein the switch comprises a plurality of receptacles for communication with a plurality of four-pair cables in communication with a plurality of micro-switches, each of the micro-switches in communication with a plurality of the endpoint devices over the single pair Ethernet cables.

18. The system of claim 13 wherein output from each of the echo cancellers is applied to a received signal at each of the independent single pair Ethernet ports.

19. The system of claim 13 wherein each of the independent single pair Ethernet ports comprises an independent data source for transmitting data to one of the endpoint devices.

20. The system of claim 13 wherein each of a plurality of single pair Ethernet channels associated with each of the independent single pair Ethernet ports carries an identifier.

* * * * *